Sept. 8, 1959
G. MARTELLI ET AL
2,902,718
ROTARY MACHINE FOR THE AUTOMATIC VACUUM FORMING
OF CONTINUOUS THERMOPLASTIC BANDS
Filed Feb. 18, 1957
3 Sheets-Sheet 1
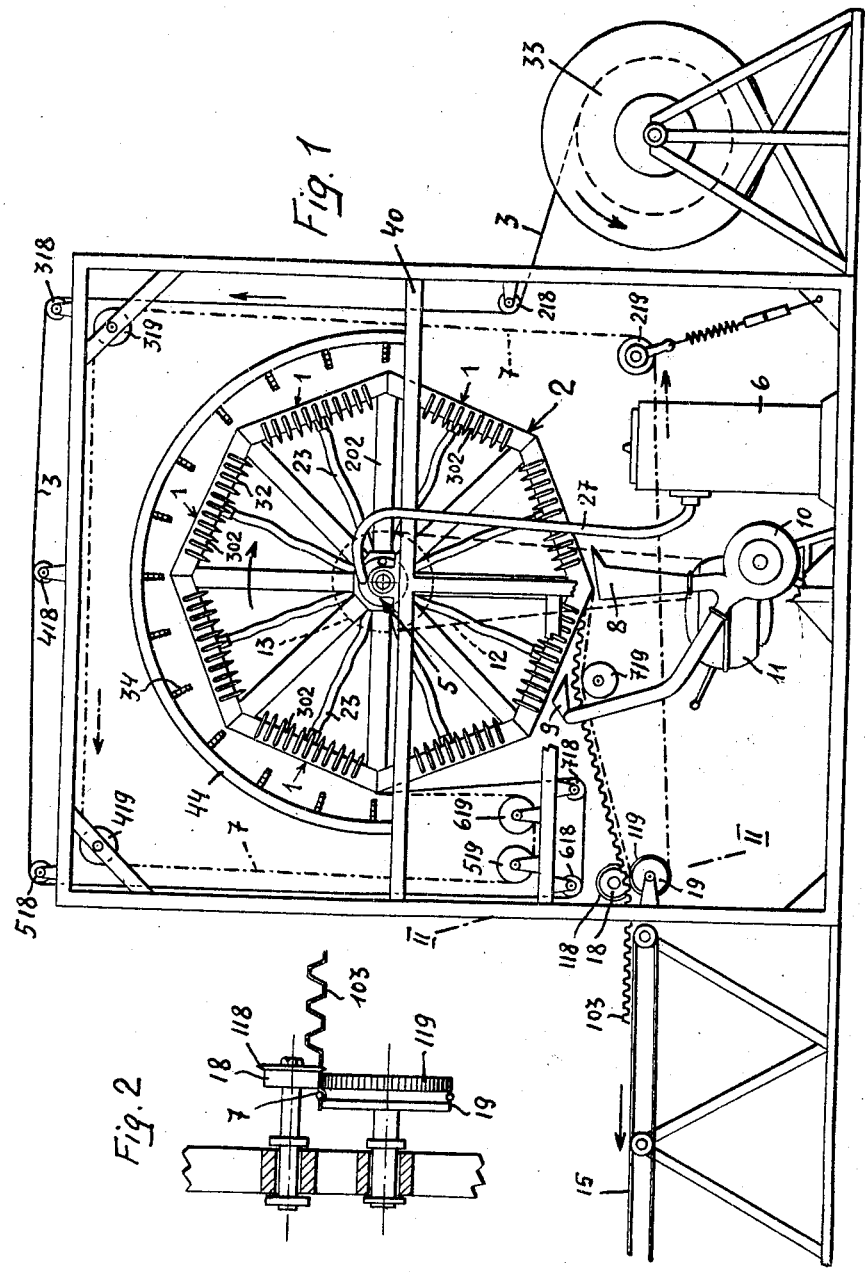
INVENTORS
GUIDO MARTELLI, NERIO MARTELLI
AND FRANCESCO MARTELLI
BY
ATTORNEY Sept. 8, 1959 G. MARTELLI ET AL 2,902,718
ROTARY MACHINE FOR THE AUTOMATIC VACUUM FORMING
OF CONTINUOUS THERMOPLASTIC BANDS
Filed Feb. 18, 1957 3 Sheets-Sheet 2
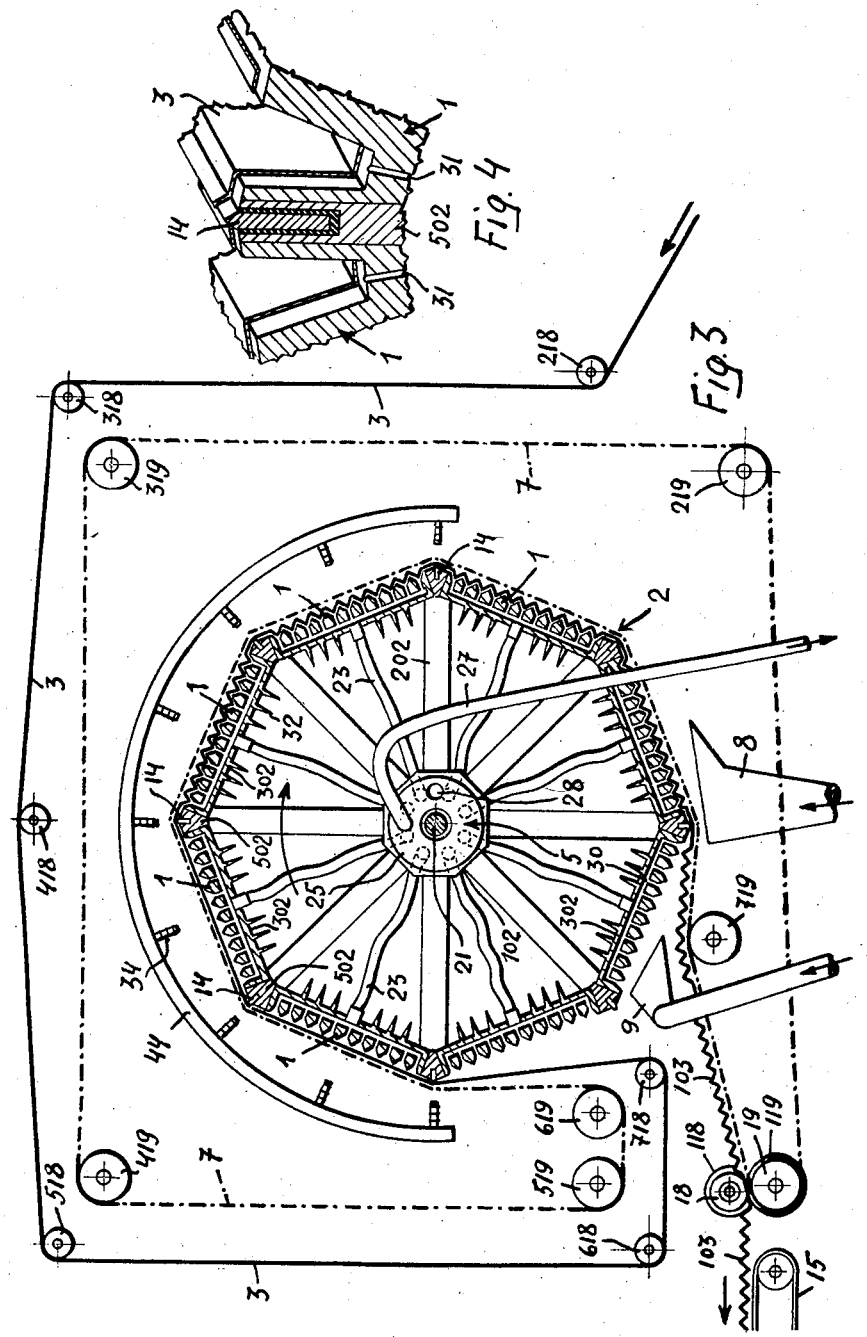
INVENTORS
GUIDO MARTELLI, NERIO MARTELLI
AND FRANCESCO MARTELLI
BY
ATTORNEY

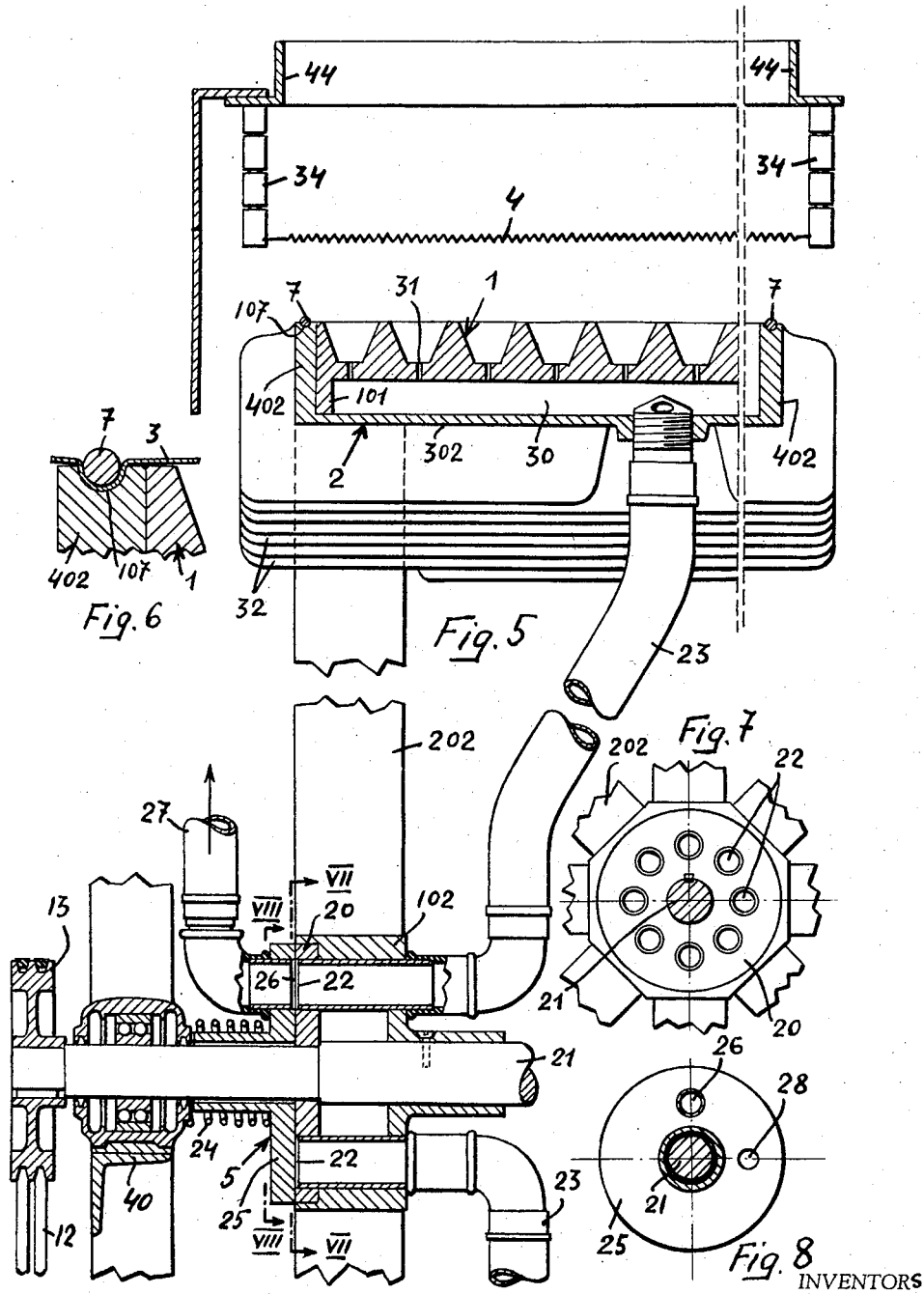

United States Patent Office 2,902,718
Patented Sept. 8, 1959

2,902,718

ROTARY MACHINE FOR THE AUTOMATIC VACUUM FORMING OF CONTINUOUS THERMOPLASTIC BANDS

Guido Martelli, Nerio Martelli, and Francesco Martelli, Bologna, Italy

Application February 18, 1957, Serial No. 640,690

Claims priority, application Italy February 21, 1956

8 Claims. (Cl. 18—19)

This invention relates to machines for the vacuum forming of sheets of thermoplastic material, viz. machines in which the sheets of thermoplastic material or the like are subjected first to the action of heat until they become plastic and then are drawn against molds by suction, so as to adhere against the mold surface, whereafter the formed sheets are cooled so as to become again solid and then are detached from the molds.

The invention aims to provide a rotary vacuum-forming machine which is adapted to perform the above-outlined vacuum-forming process in a continuous manner on continuous sheets or bands of thermoplastic material and which is particularly adapted to form tray-like members provided with deep cells and/or high protuberances, such as those employed for the packing of eggs, fruits and like articles.

One of the objects of the invention is to provide a machine comprising a revolving mold-carrying drum and in which the section of the sheet which comes to be in forming position is maintained tightly adherent all around the corresponding drum mold, this tight seal being ensured in longitudinal direction by a pair of endless flexible members, such as cords or the like which compress the corresponding sheet section, while in plastic condition, against the edge portions of said drum, which are preferably grooved, while the tight seal in transversal direction and possibly the cutting of the trays are effected by the provision of projecting transversal walls or ribs against which the parts of the said plastic sheet which correspond to the transversal edges of the traylike members are drawn.

Another object of the invention is to provide simple and efficient means for utilizing part of the heat preheating the sheets and means for cooling and detaching at the same time the formed sheet sections from the mold.

Still another object is to provide a machine of the kind above referred to in which the molds are easily changeable.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawings, wherein like reference characters indicate like parts throughout the several figures and in which:

Figure 1 is a side elevation of the rotary machine according to the invention.

Figure 2 is a section on line II—II of Figure 1.

Figure 3 shows in elevation with parts in section the mold-carrying rotary drum and annexed parts.

Figure 4 is a perspective view with parts in section and at enlarged scale of a detail of Figure 3.

Figure 5 is a vertical section through a part of the mold-carrying drum and of the vacuum-distributing valve.

Figure 6 shows in section and at an enlarged scale a detail of the sealing means shown in Figure 5, and Figures 7 and 8 are sections on lines VII—VII and VIII—VIII of Figure 5.

With reference to the drawings, the molds 1, Fig. 1, on which the thermoplastic sheet material is formed, are constituted by substantially rectangular plates, which may be either plane, as shown, or even shaped as cylindrical sectors, provided with an upper or molding face provided with protuberances, relatively deep cavities, corrugations or other formations, a lower face and a number of perforations 31 putting into communication the space above the upper face with the space below the lower face. The molds are surrounded by a substantially rectangular frame 101 (Fig. 5) adapted to tightly fit into correspondingly shaped sections of a drum 2, said sections comprising a bottom part 302, provided with cooling fins 32, side walls 402 provided at their top with a longitudinal groove and transversal walls 502 (Figures 3 and 4), so that the outside of said drum is constituted by a number of adjacent vat-like cells 302—402—502 into each of which a mold 1 may be inserted with a substantially air-tight fit and so as to leave between its lower face and the corresponding bottom part 302 a chamber 30 in which one end of a pipe 23 opens the other end of which is connected through a suitable fitting to one of the ports 22 of a rotary valve member 20 (Figures 5 and 7), fastened to a hub 102 keyed to the drum-driving shaft 21 and provided with a number of spokes 202 which carry the said drum 2.

The rotary valve member 20 is in tight sliding contact with a fixed valve member 25 (Figures 1, 5 and 8) pushed thereagainst by a spring 24. Said valve member 25 is provided with two ports one of which, 26, is connected to a source of suction or pump 6 by means of a pipe 27, while the other port is a vent port which opens to the atmosphere, the said two ports being angularly spaced as shown, on the path of the ports 22 of the rotary valve member 20, so that when the drum is rotated, these ports 22 and the corresponding chambers 302 under each mold 1, are put into communication first with the source of suction 6 and then with the atmosphere.

On a frame part 40 (Fig. 1), of the machine arc-shaped supporting members 44 are attached (Figs. 1, 3 and 5), which extend above the upper drum circumference and carry suitable insulators 34 between which suitable heating electric resistances 4 are attached, which receive the electric current through conventional means (not shown) and heat the underlying drum section, including the side walls 402 and, of course, the parts lying thereon.

The drum 2 is continuously rotated at a suitable speed by a motor which through a suitable speed-down gear 11 (Fig. 1) drives a belt 12 which drives a pulley 13 (Figures 1 and 7) keyed on to the drum-carrying shaft 21. The same motor which drives the gear 11 may drive also a fan 10 provided with two delivery nozzles 8 and 9 which blow fresh air against two angularly spaced sections of the underside of the drum 2.

The continuous sheet of plastic material 3 is drawn from a roll 33 by the rotating drum 2 on which it is placed and passes on a number of guide pulleys or rollers 218, 318, 418, 518, 618 and 718 and from this latter it is led on the upper periphery of the rotating drum and then downwardly and away from the drum, the sheet being in formed condition as shown at 103 in Figure 1 and as will be described hereinafter and passes between a positively driven corrugated or toothed wheel 119 (Figures 1 and 2) and a pulley 18 provided with a trimming disc cutter 118 which trims the margins of the formed sheet 103 which is discharged in a conventional manner, for example, by means of a belt carrier 15.

As it is apparent from the drawing, the plastic sheet 3 is led first above the heated electric resistances 4 carried by the insulators 34 and is thus pre-heated and then is led onto the upper half of the drum, a short distance below said resistances, which heat same to a plastic condition. In the lower right-hand quarter of the periphery of the drum (as seen in Figure 1) the plastic sheet is cooled by the action of the fins 32 and of the air jets from the nozzles 8 and 9, this latter blowing air between the mold and the formed sheet 103, thus helping in detaching same from the mold.

As it is apparent from Figure 3 of the drawing, the sheet which lies on the top part of the drum which has been sufficiently heated to become plastic, is subjected to a suction due to the fact that the corresponding mold-carrying vat is put into communication with the source of suction 6 through pipe 27. In order that this suction may be effective in sucking the plastic sheet against the mold and cause same to completely adhere thereto, its marginal portions which have been also heated to a plastic condition, are compressed into the grooves at the top of the side walls 402 of the mold-carrying vats by the corresponding heated sections of a pair of endless metallic cords 7 which are led on about three-quarters of the periphery of the drum 2, from which they are driven and press into said grooves the margins of the plastic sheet, thus forming a kind of packing ensuring a tight adherence thereof to the drum walls 403, viz. in longitudinal direction. The tightness of the sheet in transversal direction is ensured by the transversal walls 502 which, whenever the formed sheet has to be cut into sections, are provided with projecting cutter edges 14, Figure 4. As shown in the drawing, the metallic cords F are led on grooved pulleys 219, 319, 419, 519 and 619 all around the drum, at a certain distance therefrom and suitably spaced from the resistances-carrying members 44, and beyond the lower drum part they are guided on pulleys 719 suitably spaced from the said drum towards a return pulley 19 which is driven thereby and feeds the formed sheet 103 towards the endless belt carrier 15 and at the meantime frictionally drives the pulleys 18 (one for each side) which with their cutting trimming edges 118 trim margins of the formed plastic sheet 103.

The detaching of the formed sheets from the molds takes place readily, due to the face that, after the sheets have been vacuum-formed at the top part of the drum (where they are under the suction due to the communication of the molds with the source of suction through pipe 27 and corresponding valve ports 26 and 22) the molds are put in communication with the atmosphere as soon as the corresponding valve port 22 passes in correspondence with the vent valve port 28.

Of course, the machine according to the invention may undergo numerous changes within the scope of the appended claims.

We claim:

1. A high-speed molding machine for continuously forming trays or the like from thermoplastic material, comprising a rotatably mounted drum, means for rotating said drum, means defining a plurality of independent perforated mold areas around the periphery of said drum with a plurality of mold surfaces within said mold areas, heating means partially surrounding the periphery of said drum in spaced relation thereto, means for feeding a continuous strip of thermoplastic sheet material onto the periphery of said drum and between said drum and said heating means, suction means in communication with the perforations in said mold areas for drawing the sheet material into engagement with the mold surfaces of said mold areas, valve means controlling said suction means and operative upon rotation of said drum to place said suction means in communication with said mold areas successively as the respective areas are revolved through the latter part of the zone surrounded by said heating means, and sealing means engageable with the sheet material to form an airtight seal with said drum around each of said mold areas, said sealing means including transverse portions on said drum and respectively between said mold areas for sealing engagement with the sheet material transversely thereof, said drum having circumferential grooves on opposite sides of said mold areas, and endless means trained partially around the periphery of said drum and nested in said grooves to overlie and press the sheet material into said grooves in sealing engagement with said drum and hold said sheet tautly in sealing engagement with said transverse portions, said endless means being disposed to engage said grooves within the heated zone at a point prior to the operation of said valve means and at which the thermoplastic sheet has been softened by said heating means, whereby the sheet material is softened as it initially passes into the zone surrounded by said heating means, is sealed against the periphery of said drum and then molded by action of said suction means while in said zone and in a softened condition.

2. A machine according to claim 1 comprising blower means for directing cooling air onto the molded sheet material as it is pulled from said drum to set the softened material, said blower means including first means for directing air against the outer side of the sheet material just prior to its removal from the drum, and second means disposed between said drum and the inner side of the sheet material immediately after its removal from the drum.

3. A machine according to claim 1 wherein said sheet material feeding means includes means for feeding said sheet material adjacent said heating means and on the opposite side from the drum prior to feeding onto said drum to preheat the material.

4. A high-speed molding machine according to claim 1 comprising rotary means including rotary cutters for slitting the molded sheet material longitudinally, said rotary means being disposed laterally of that portion of the drum where the molded sheet is removed from said drum, said endless means extending laterally from said drum and over said rotary means to drive the latter and support the molded sheet as it is removed from said drum.

5. A high-speed molding machine according to claim 1 wherein said mold areas extend substantially across the width of said drum.

6. A high-speed molding machine according to claim 1 wherein said mold areas are substantially flat.

7. A high-speed molding machine according to claim 1 wherein said drum comprises a plurality of chamberlike recesses opening through its periphery and in communication with said suction means, said mold areas comprising perforated mold plates removably nested in said recesses.

8. A high-speed molding machine according to claim 1 wherein said valve means includes a hub slide valve and means for communicating the perforations in the mold areas with the atmosphere after the thermoplastic sheet has been molded.

References Cited in the file of this patent

UNITED STATES PATENTS

| | | |
|---|---|---|
| 2,230,189 | Ferngren | Jan. 28, 1941 |
| 2,387,747 | Cowley | Oct. 30, 1945 |
| 2,468,697 | Wiley | Apr. 26, 1949 |
| 2,483,339 | Gardner et al. | Sept. 27, 1949 |
| 2,490,781 | Cloud | Dec. 31, 1949 |
| 2,513,852 | Donofrio | July 4, 1950 |
| 2,606,343 | Cooper | Aug. 12, 1952 |
| 2,702,406 | Reed | Feb. 22, 1955 |
| 2,717,423 | Uhlig et al. | Sept. 13, 1955 |
| 2,776,451 | Chavannes | Jan. 8, 1957 |